US009553752B1

(12) United States Patent
Patel et al.

(10) Patent No.: US 9,553,752 B1
(45) Date of Patent: Jan. 24, 2017

(54) METHOD AND APPARATUS FOR FREQUENCY OFFSET DETECTION IN OFDM SYSTEMS WITH FREQUENCY REUSE

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 41 days.

(21) Appl. No.: 14/744,833

(22) Filed: Jun. 19, 2015

(51) Int. Cl.
*H04L 27/26* (2006.01)
*H04J 11/00* (2006.01)

(52) U.S. Cl.
CPC .......... *H04L 27/266* (2013.01); *H04J 11/0063* (2013.01); *H04J 11/0089* (2013.01); *H04L 27/2607* (2013.01); *H04L 27/2659* (2013.01); *H04J 2011/0096* (2013.01)

(58) Field of Classification Search
None
See application file for complete search history.

(56) References Cited

U.S. PATENT DOCUMENTS

| | | | |
|---|---|---|---|
| 7,876,858 B1* | 1/2011 | Lee ..................... | H04L 27/2655 375/259 |
| 2007/0133699 A1* | 6/2007 | Roh .................... | H04L 27/2657 375/260 |
| 2008/0192874 A1* | 8/2008 | Lim .................... | H04L 27/2676 375/359 |
| 2009/0067517 A1* | 3/2009 | Hung ................... | H04L 5/0007 375/260 |
| 2011/0110445 A1* | 5/2011 | Sameer ............... | H04L 27/2659 375/260 |
| 2013/0021977 A1* | 1/2013 | Yang ................... | H04L 27/2659 370/328 |

* cited by examiner

*Primary Examiner* — Brian Roberts
(74) *Attorney, Agent, or Firm* — Lerner, David, Littenberg, Krumholz & Mentlik, LLP

(57) ABSTRACT

Estimating and compensating the frequency offset between a transmitter and a receiver is essential for reliable communication in wireless communication systems. Before a client terminal synchronizes with a base station, the initial frequency offset may be high. The frequency offset estimation may need to be performed even without having time synchronization with a base station. In case of cellular systems multiple base stations may be using the same RF channel to transmit their signals. The signals from different base stations may be superimposed at the receiver of the client terminal. A method and apparatus are disclosed for frequency offset estimation in presence of the signals from multiple base stations and with unknown timing of the base station.

20 Claims, 11 Drawing Sheets

METHOD AND APPARATUS FOR FREQUENCY OFFSET DETECTION IN OFDM SYSTEMS WITH FREQUENCY REUSE

BACKGROUND

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred as the serving base station. In some wireless communication systems the serving base station is normally referred as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred as a neighbor cell.

Duplexing refers to the ability to provide bidirectional communication in a system, i.e., from base station to client terminals (DL) and from client terminals to base station (UL). There are different methods for providing bidirectional communication. One of the commonly used duplexing method is the Frequency Division Duplexing (FDD). In FDD wireless communication systems, two different frequencies, one for DL and another for UL are used for communication. In FDD wireless communication system, the client terminals may be receiving and transmitting simultaneously.

Another commonly used method is the Time Division Duplexing (TDD). In TDD based wireless communication systems, the same exact frequency is used for communication in both DL and UL. In TDD wireless communication systems, the client terminals may be either receiving or transmitting but not both simultaneously. The use of the radio frequency (RF) channel for DL and UL may alternate on periodic basis. For example, in every 5 ms time duration, during the first half, the RF channel may be used for DL and during the second half, the RF channel may be used for UL. In some communication systems the time duration for which the RF channel is used for DL and UL may be adjustable and may be changed dynamically.

Yet another commonly used duplexing method is the Half-duplex FDD (H-FDD). In this method, different frequencies are used for DL and UL but the client terminals may not perform receive and transmit operations at the same time. Similar to TDD wireless communication systems, a client terminal using H-FDD method must periodically switch between DL and UL operation. All three duplexing methods are illustrated in FIG. 2.

In many TDD wireless communication systems, normally the communication between the base station and client terminals is organized into frames as shown in FIG. 3. The frame duration may be different for different communication systems and normally it may be in the order of milliseconds. For a given communication system the frame duration may be fixed. For example, the frame duration may be 10 milliseconds.

In a TDD wireless communication system, a frame may be divided into a DL subframe and a UL subframe. In TDD wireless communication systems, the communication from base station to the client terminal (DL) direction takes place during the DL subframe and the communication from client terminal to network (UL) direction takes place during UL subframe on the same RF channel.

When a client terminal is powered on, it may not have information about the frame timing of the base station. The client terminal may first perform power scan and select a suitable RF channel for performing synchronization with the base station timing. Therefore, in general the power scan may be performed by the client terminal when its timing is not aligned with that of the base station.

Orthogonal Frequency Division Multiplexing (OFDM) systems typically use Cyclic Prefix (CP) to combat inter-symbol interference and maintain orthogonality of the sub-carriers under multipath fading propagation environment. The CP is a portion of the sample data that is copied from the tail portion of an OFDM symbol to the beginning of the OFDM symbol as shown in FIG. 4. One or more OFDM symbols in sequence as shown in FIG. 4 are referred herein as OFDM signal.

In addition to the purposes mentioned above, the CP is often used for frequency offset estimation at the receiver. Any frequency offset at the receiver relative to the center frequency of the transmitted signal will cause the phase of the received signal to change linearly as function of time. The two parts of an OFDM signal that are identical at the transmitter, i.e., the CP and the tail portion of the OFDM symbol, may undergo different phase change at the receiver due to the frequency offset. Therefore, the frequency offset can be estimated by performing correlation between the CP and the tail portion of the symbol. The angle of the CP correlation indicates the amount of phase rotation that is accumulated over the duration of an OFDM symbol. This accumulated phase rotation is then used for frequency offset estimation. There may be other impairments such as noise, fading and interference that may make the two parts of an OFDM symbol different. However, such impairments may be random in nature and may tend to cancel out during CP correlation computation. On the other hand, the phase offset between the two parts of the OFDM symbol tend to accumulate as each sample pair of parts being correlated may have on average the same phase difference.

The frequency offset at the receiver during initial synchronization may be very high. Furthermore, since the client terminal is not synchronized to any base station during initial synchronization, the OFDM symbol boundaries are not known to the client terminal. In wireless communication system deployments where frequency reuse is employed, the signals from several base stations may be superimposed. In some cases, the various base stations may not be time synchronized, i.e., the OFDM symbol boundaries for the different cells may not be time aligned. Even if the OFDM symbol boundaries are time aligned the propagation delays from different base stations to the client terminal may be different and therefore the OFDM symbol timing may not be time aligned at the client terminal receiver. Furthermore, in some wireless communication systems such as $3^{rd}$ Generation Partnership Project (3GPP) Long Term Evolution (LTE) or LTE-Advanced, an option of using different CP length exists and the exact CP in use may not be known a priori to the client terminal. Also, the different base stations whose signals may be superimposed may be using different CP length. The overall received signal scenario is illustrated in FIG. 5. In case of TDD systems since the same frequency is used for transmit and receive, at power up the client terminal may not be aware of the boundary between DL and UL. In case of TDD systems, the significant power difference between DL and UL may create challenges in performing frequency offset estimation and may lead to inaccurate frequency offset. A method and apparatus are disclosed that enable frequency offset estimation in presence of multiple interfering OFDM signals of different CP types and with or without time synchronization for all types of duplexing schemes.

SUMMARY

In accordance with an aspect of the present invention, a method for frequency offset detection in a wireless communication system may use a plurality of Orthogonal Frequency Division Multiplexing (OFDM) signals received at a wireless communication device, in which each OFDM signal includes a cyclic prefix (CP) and a symbol, the symbol of each OFDM signal has a same length and the OFDM signals are of a predetermined periodic interval. The method may include controlling, by a processing device, for each of the OFDM signals received at the wireless communication device, determining a CP correlation value indicating an amount of phase rotation accumulated between the CP and a tail portion of the symbol over a duration of the symbol using a predetermined shortest CP length of the wireless communication system. In addition, the method may include controlling, by the processing device: determining an average power of the OFDM signals; coherently combining the CP correlation values for the OFDM signals with stored second CP correlation values respectively for a plurality of second OFDM signals, which are offset from the OFDM signals modulo the predetermined periodic interval, to obtain combined CP correlation values; non-coherently combining the average power of the OFDM signals with a stored second average power of the second plurality of OFDM signals to obtain a combined average power; normalizing the combined CP correlation values with the combined average power to obtain normalized CP correlation values; and determining a fractional frequency offset from a final CP correlation value, in which the final CP correlation value is determined from coherently combining a maximum of an absolute value of the normalized CP correlation values and each additional peak of the normalized CP correlation values determined to satisfy first and second threshold conditions for the normalized CP correlation values.

In one alternative, the predetermined periodicity interval may be one slot of a subframe of a radio frame of the wireless communication system.

In one alternative, the OFDM signals may be of each available receive chain of a plurality of receive chains with which the wireless communication device is equipped.

In one alternative, the predetermined periodicity interval may be one slot of a subframe of a radio frame of the wireless communication system, and the method may further include: controlling, by the processing device, for all of the available receive chain, coherently combining the CP correlation values for the OFDM signals.

In one alternative, the normalizing may include determining a normalization factor for each of the OFDM signals from an average power of the CP and a tail portion of the symbol.

In one alternative, the CP correlation values may be coherently combined with the stored second CP correlation values based on gain used by an automatic gain control (AGC) at the wireless communication device.

In one alternative, the gain may include two groups of gain values.

In one alternative, the normalizing may include normalizing the coherently combined CP correlation values with the non-coherently combined average power for the two groups of gain values, respectively, to obtain first and second normalized CP correlation values, and the fractional frequency offset may be determined from a higher of a maximum of an absolute value of the first and second normalized CP correlation values.

In one alternative, the first threshold condition may specify a minimum magnitude relative to a magnitude of a highest of the normalized CP correlation values, and the second threshold may specify a minimum value of an absolute value of the normalized CP correlation values.

In one alternative, when at least two additional peaks of the normalized CP correlation values are determined to satisfy the first and second threshold conditions, the final CP correlation value may be determined based on coherently combining the maximum of an absolute value of the normalized CP correlation values with the at least two additional peaks when, for all pairs of first and second additional peaks of the at least two additional peaks, the first and second additional peaks are separated by at least the length of the symbol.

In accordance with an aspect of the present invention, an apparatus for frequency offset detection in a wireless communication system may use a plurality of Orthogonal Frequency Division Multiplexing (OFDM) signals received at a wireless communication device, in which each OFDM signal includes a cyclic prefix (CP) and a symbol, the symbol of each OFDM signal has a same length and the OFDM signals are of a predetermined periodic interval. The apparatus may include circuitry configured to, for each of the OFDM signals received at the wireless communication device, determine a CP correlation value indicating an amount of phase rotation accumulated between the CP and a tail portion of the symbol over a duration of the symbol using a predetermined shortest CP length of the wireless communication system. In addition, the circuitry may be further configured to: determine an average power of the OFDM signals; coherently combine the CP correlation values for the OFDM signals with stored second CP correlation values respectively for a plurality of second OFDM signals, which are offset from the OFDM signals modulo the predetermined periodic interval, to obtain combined CP correlation values; non-coherently combine the average power of the OFDM signals with a stored second average power of the second plurality of OFDM signals to obtain a combined average power; normalize the combined CP correlation values with the combined average power to obtain normalized CP correlation values; and determine a fractional frequency offset from a final CP correlation value, in which the final CP correlation value is determined from coherently combining a maximum of an absolute value of the normalized CP correlation values and each additional peak of the normalized CP correlation values determined to satisfy first and second threshold conditions for the normalized CP correlation values.

In one alternative of the apparatus, the predetermined periodicity interval may be one slot of a subframe of a radio frame of the wireless communication system.

In one alternative of the apparatus, the combined CP correlation values may be normalized by determining a normalization factor for each of the OFDM signals from an average power of the CP and a tail portion of the symbol.

In one alternative of the apparatus, the CP correlation values may be coherently combined with the stored second CP correlation values based on gain used by an automatic gain control (AGC) at the wireless communication device.

In one alternative of the apparatus, the first threshold condition may specify a minimum magnitude relative to a magnitude of a highest of the normalized CP correlation values, and the second threshold may specify a minimum value of an absolute value of the normalized CP correlation values.

In accordance with an aspect of the present invention, a wireless communication device for detecting frequency offset in a wireless communication system may include a receiver to receive a plurality of Orthogonal Frequency Division Multiplexing (OFDM) signals, in which each OFDM signal includes a cyclic prefix (CP) and a symbol, the symbol of each OFDM signal has a same length and the OFDM signals are of a predetermined periodic interval. The device may further include circuitry configured to, for each of the OFDM signals, determine a CP correlation value indicating an amount of phase rotation accumulated between the CP and a tail portion of the symbol over a duration of the symbol using a predetermined shortest CP length of the wireless communication system. The circuitry is further may be configured to: determine an average power of the OFDM signals; coherently combine the CP correlation values for the OFDM signals with stored second CP correlation values respectively for a plurality of second OFDM signals, which are offset from the OFDM signals modulo the predetermined periodic interval, to obtain combined CP correlation values; non-coherently combine the average power of the OFDM signals with a stored second average power of the second plurality of OFDM signals to obtain a combined average power; normalize the combined CP correlation values with the combined average power to obtain normalized CP correlation values; and determine a fractional frequency offset from a final CP correlation value, in which the final CP correlation value is determined from coherently combining a maximum of an absolute value of the normalized CP correlation values and each additional peak of the normalized CP correlation values determined to satisfy first and second threshold conditions for the normalized CP correlation values.

In one alternative of the device, the predetermined periodicity interval may be one slot of a subframe of a radio frame of the wireless communication system.

In one alternative of the device, the combined CP correlation values may be normalized by determining a normalization factor for each of the OFDM signals from an average power of the CP and a tail portion of the symbol.

In one alternative of the device, the CP correlation values may be coherently combined with the stored second CP correlation values based on gain used by an automatic gain control (AGC) at the wireless communication device.

In one alternative of the device, the first threshold condition may specify a minimum magnitude relative to a magnitude of a highest of the normalized CP correlation values, and the second threshold may specify a minimum value of an absolute value of the normalized CP correlation values.

DETAILED DESCRIPTION

Figure 1:
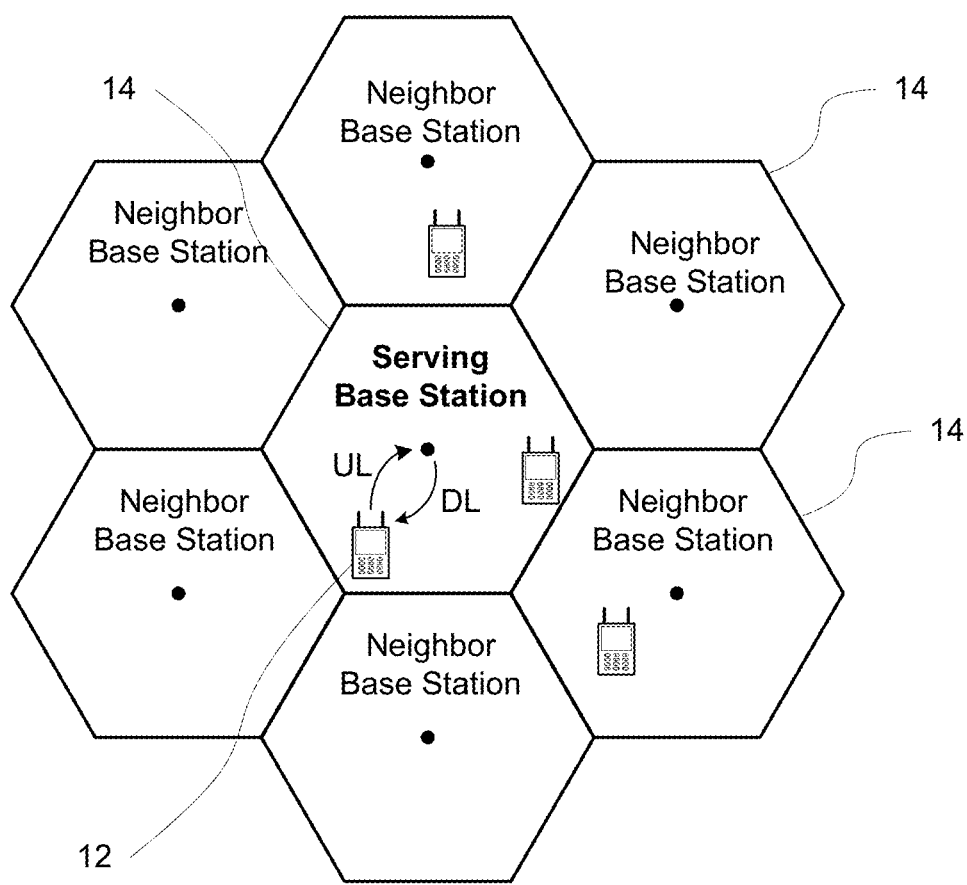
FIG. 1 illustrates a conventional wireless cellular communication system.
Figure 2:
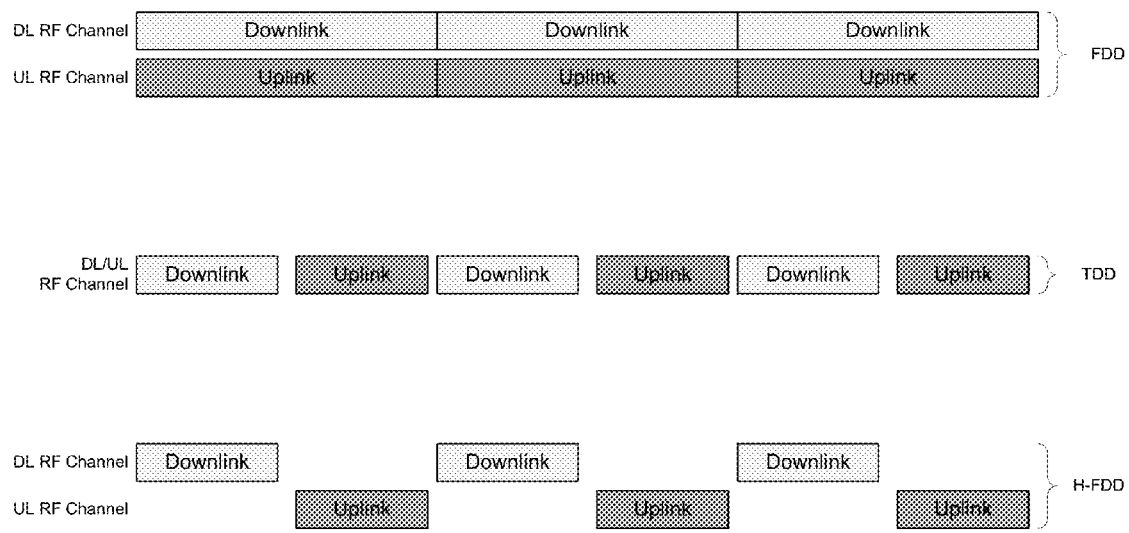
FIG. 2 illustrates FDD, TDD and H-FDD duplexing techniques.
Figure 3:
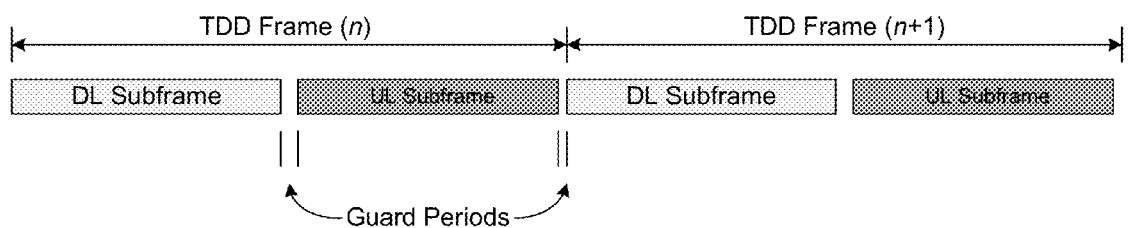
FIG. 3 illustrates a TDD frame consisting of DL portions and UL portions.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

A method and apparatus are disclosed that enable the detection of frequency offset under the condition where the OFDM symbol boundaries are not known and signals from multiple base stations that may use different CP lengths are superimposed over each other. The method is applicable to all three types of duplexing schemes.

The method and apparatus described in the present invention are applicable to any type of OFDM system that uses cyclic prefix such as Wireless Local Area Network (WLAN) based on IEEE 802.11 family of standards, WiMAX (Worldwide Interoperability for Microwave Access) based on IEEE 802.16 family of standards, Mobile Broadband Wireless Access (MBWA) system based on IEEE 802.20 standard, Digital video Broadcasting system, the 3GPP LTE and LTE-Advanced wireless communication system, etc. To illustrate the aspects of the invention better the 3GPP LTE wireless communication system is used in the present document.

Figure 6:
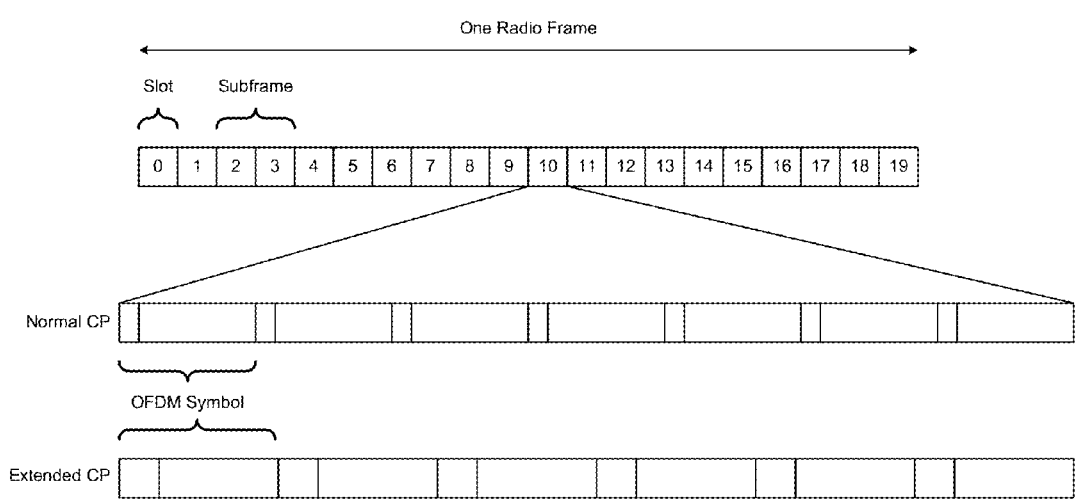
FIG. 6 illustrates the frame structure of the air interface of the 3GPP LTE wireless communication system.

Wireless communication systems may employ some form of framing in the air interface. For example, 10 ms radio frames are used in the 3GPP LTE wireless communication systems and each radio frame consists of 10 subframes as shown in FIG. 6. Each subframe in turn consists of two slots and each slot consists of 6 or 7 OFDM symbols depending on the type of CP used as shown in FIG. 6. In 3GPP LTE wireless communication system, two different CP lengths are used and they are referred to as Normal CP and Extended CP. In wireless communication systems, normally the specific air interface frame structure repeats itself over certain periodicity.

The client terminal performs the CP correlation over samples that are separated by the duration of one OFDM symbol (excluding CP). Even though different CP durations may be used by different base stations, the duration of the OFDM symbol excluding the CP may be the same. The term duration refers to units of time but in terms of number of samples it may correspond to different number of samples for the same duration depending on the sample rate being used. The CP duration and OFDM symbol duration in units of samples will be referred herein as CP length and OFDM symbol length, respectively.

Figure 5:
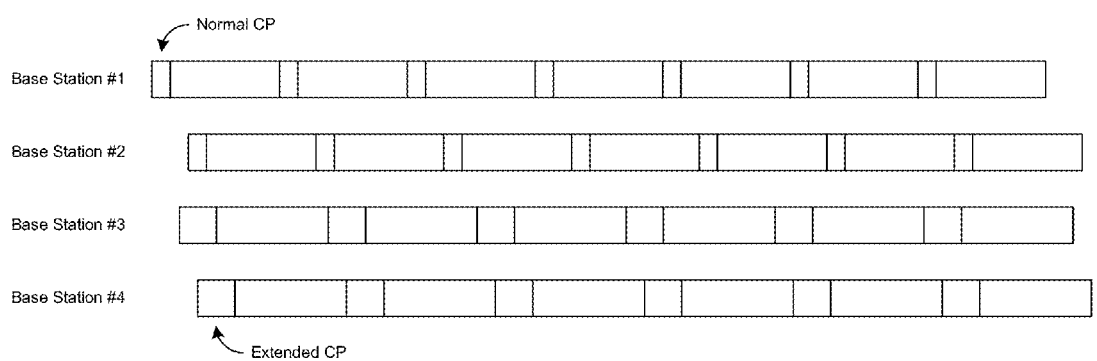
FIG. 5 illustrates signals from a set of base stations that are not time synchronized and using different CP lengths.

According to an aspect of the present invention, for every incoming sample the CP correlation is performed using a single correlator assuming the shortest of the all possible CP lengths that may be used by the wireless communication system according to its specifications. For example, in case of scenario illustrated in FIG. 5, CP correlation assuming Normal CP may be performed. According to an aspect of the present invention the CP correlation values are saved over a certain periodicity interval. According to an aspect of the present invention, in case of 3GPP LTE wireless communication system, the CP correlation may be saved over the duration of one slot since the OFDM symbol structure repeats over this interval for both Normal CP and Extended CP. The individual CP correlation values may be unreliable to be used for frequency error estimation. Therefore, CP correlation is performed over a relatively longer period of time and the different CP correlation values may be combined to form a more reliable metric. However, without knowing the OFDM symbol boundaries the CP metrics over multiple OFDM symbols may not combine constructively. According to an aspect of the present invention, the CP correlation values are combined while considering their signs, such that the CP correlation values are coherently combined, over a period of one slot interval. For example when coherently combining complex numbers, the real and imaginary parts from two quantities are combined separately while keeping their respective signs. Since the OFDM symbol structure in an LTE frame is identical over the duration of one slot, even if the actual OFDM symbol boundary may not be known, the CP correlation over multiple slot durations has very high likelihood to constructively combine and may provide more reliable correlation metrics. The neighbor cells whose signals are superimposed may also have similar characteristics over one slot periodicity even if different CP lengths are used. Since the CP correlation is performed over the shortest of the possible CP lengths, the different CP lengths are also handled concurrently according to the aspects of the present invention.

According to another aspect of the invention, the CP correlation may be performed over all the available receive chains in case a client terminal is equipped with more than one receive chain. The CP correlation metrics from all the receive chains are combined coherently over the one slot combining interval.

Figure 4:
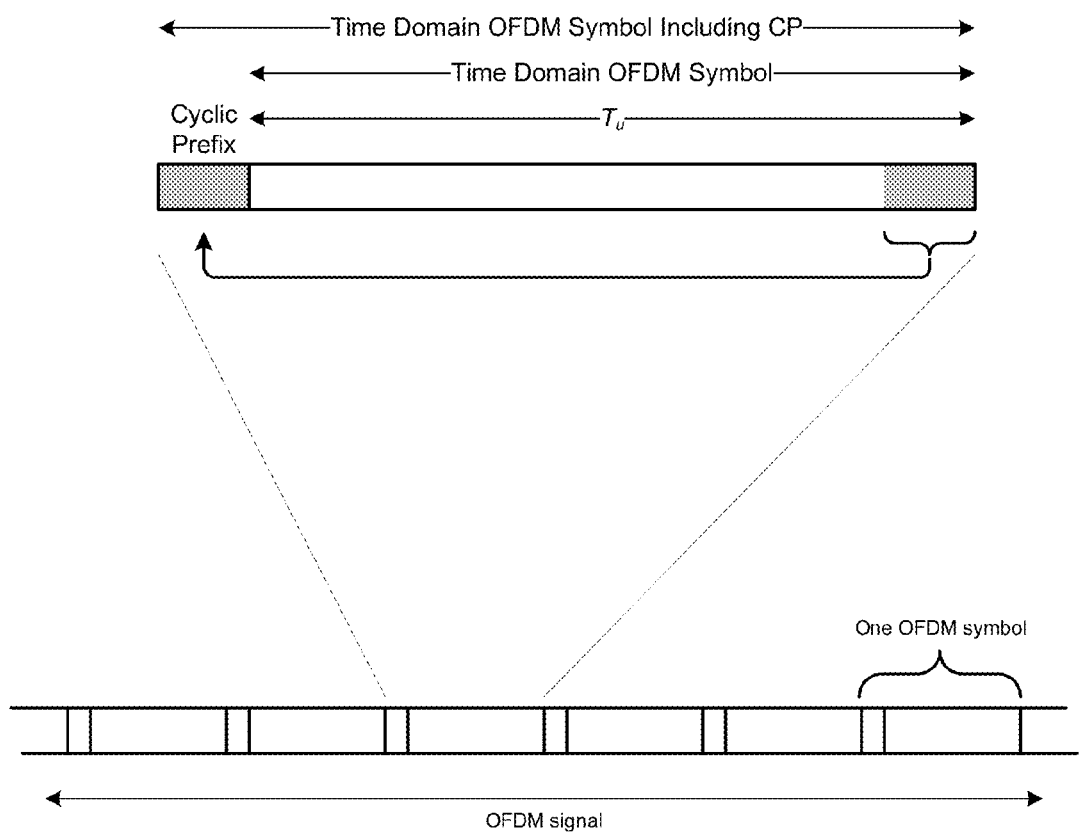
FIG. 4 illustrates an OFDM symbol with Cyclic Prefix Insertion.

According to another aspect of the invention, the CP correlation may be normalized by the power of the received samples. The normalization may be performed at the end of frequency offset estimation window. The power of the incoming samples is accumulated over the same interval as CP correlation. According to another aspect of the invention, the normalization factor is computed by using the average of the power computed over two portions of the samples used for CP correlation from the same OFDM symbol. The two portions of an OFDM symbol used for CP correlation are illustrated in FIG. 4.

In case of TDD wireless communication systems, some of the slots in the averaging interval may be used by other nearby active client terminals for uplink transmission and may have much different power level. According to an aspect of the present invention, the coherent combining of the CP correlations over a period of slot duration is further separated into two groups. According to an aspect of the present invention, the CP correlations are coherently combined with one of the two buffers based on the gain used by the Automatic Gain Control (AGC) in the client terminal. If the gain used by AGC is above a configurable gain threshold the first buffer is used for combining the CP correlation. If the gain used by AGC is below the configurable gain threshold the second buffer is used for combining the CP correlation. According to an aspect of the present invention, the CP correlation from each of the buffers is first normalized using the power levels corresponding to each buffer and then the higher of the normalized maximum is used to determine the fractional frequency offset. This method may improve the estimation accuracy of the frequency offset in TDD wireless communication systems.

Figure 7:
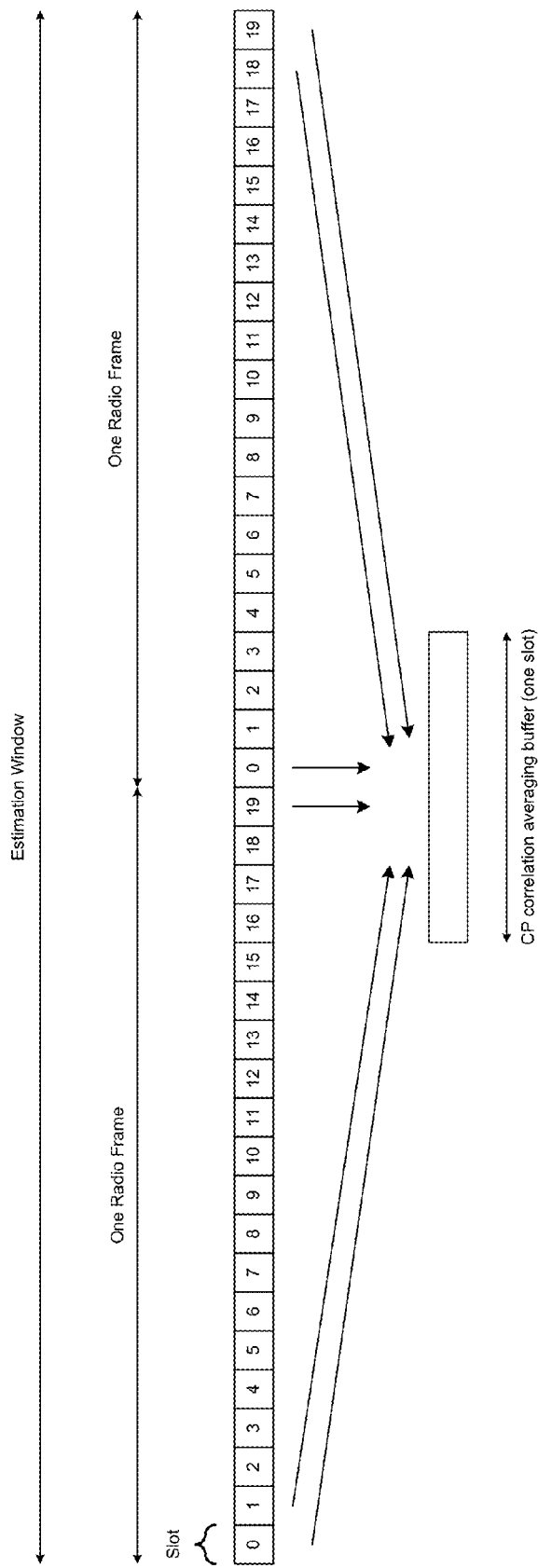
FIG. 7 illustrates the coherent combining of CP correlation over one slot interval for an estimation window duration of 20 ms.

According to an aspect of the present invention, the estimation window duration may be configurable. According to an aspect of the present invention, after performing CP correlation over the estimation window, e.g., 20 ms, the accumulated normalized CP correlations over the specific periodicity interval may be searched for the maximum absolute value of CP correlation. According to an aspect of the present invention the fractional frequency offset may be estimated from the angle of the normalized accumulated CP correlation corresponding to the maximum absolute value. For example, as shown in FIG. 7, in case of 3GPP LTE wireless communication systems, the CP correlation may be performed over an estimation window of 20 ms and the periodicity of one slot (0.5 ms) leading to combining of 40 CP correlations enabling improved CP correlation metrics. According to an aspect of the present invention, selecting the maximum from the accumulated CP correlations over one slot (0.5 ms), the cell with the strongest correlation metric may be used for fractional frequency offset computation.

According to another aspect of the present invention, additional peaks may be selected for frequency offset estimation. According to an aspect of the present invention, the additional peaks may be selected based on two configurable thresholds for the normalized accumulated CP correlation. A first configurable threshold specifies the minimum magnitude of the additional peaks relative to the magnitude of the top CP correlation peak. A second configurable threshold specifies the minimum value of the absolute value of the normalized CP correlation for a peak. Only when both the conditions are met, the additional peaks are used for further combining. According to another aspect of the present invention, the additional peaks may be selected such that the peaks are separated by at least one OFDM symbol duration from each other. According to another aspect of the present invention, the CP correlation corresponding to the selected additional peaks and the maximum peak are coherently combined to form a metric that may be more robust against noise and interference.

The knowledge of the fractional frequency offset based on the disclosed method enables the client terminal to correct local oscillator settings such that subsequent processing in the initial synchronization procedure may be carried out in frequency synchronous manner. For example, in case of 3GPP LTE wireless communication, if the frequency offset is first corrected then the detection performance of the other synchronization signals may be improved significantly.

The method disclosed in the present invention is robust against presence of signals from multiple base stations and with different CP lengths and may not require a priori knowledge of the CP lengths and the OFDM symbol boundaries.

Figure 8:
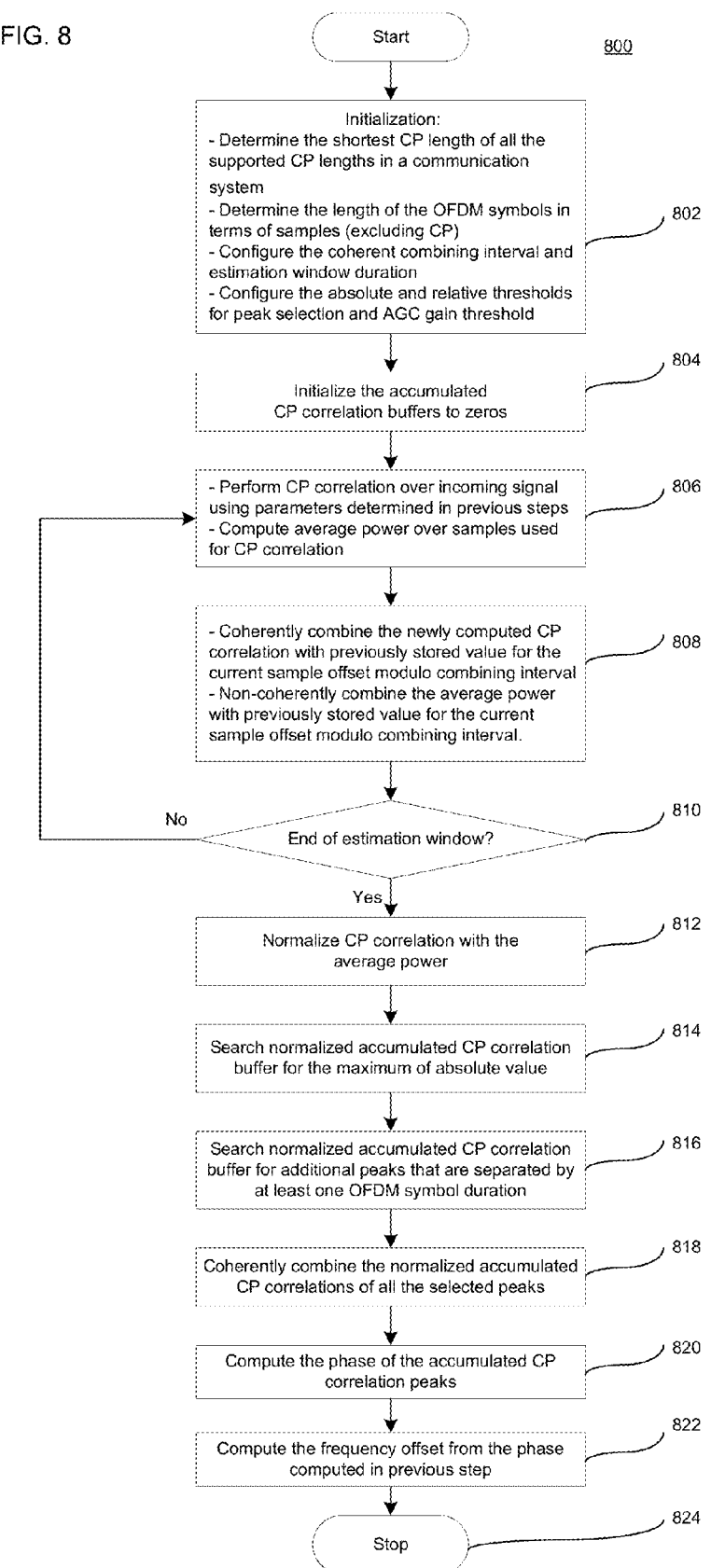
FIG. 8 illustrates the flow diagram for the processing steps according to aspects of the present invention.

The flow diagram 800 contained in FIG. 8 illustrates the frequency offset estimation method according to the aspects of the present invention. The processing relevant to the present invention begins in processing stage 802 where the key parameters for the frequency offset estimation are determined and configured. Specifically, the shortest CP length of all the supported CP lengths in a communication system and the length of the OFDM symbol in terms of samples for the sampling rate to be used for detection are determined. The coherent combining interval, the estimation window duration, the relative and absolute thresholds for the detection of additional peaks (aside from the top peak), and the AGC gain threshold are initialized. At processing stage 804, the accumulated CP correlation buffers are initialized to zero. At processing stage 806, CP correlation is performed using the parameters determined and configured in processing stage 802. In parallel, the average power over the samples used for the CP correlation is also computed at processing stage 806. At processing stage 808, the newly computed CP correlation is coherently combined with the previously saved CP correlation for the same sample offset modulo the coherent combining interval. For example, if the sampling rate is 1.92 Msps the combining interval N of one slot corresponds to 960 samples, i.e., N=960. The CP correlation may be computed over multiple such combining intervals as illustrated in FIG. 7. The $n^{th}$ CP correlation may be combined with the contents of the buffer at the index n modulo N. For example, referring to FIG. 7, the CP correlations may be performed over a duration of 20 slots and the CP correlation buffer is for only one slot. When operating at 1.92 Msps, each slot (0.5 ms) has 1.92 Msps*0.5 ms=960 samples. The CP correlation value for the 0th sample is stored in the 0th location in the CP correlation buffer. The CP correlation value for the 959th sample is stored in the 959th location in the CP correlation buffer. The CP correlation value for the 960th sample is combined with the CP correlation previously stored in the (960 mod 960)=0th location in the CP correlation buffer and stored back in the same location. The CP correlation value for the 2*960=1920th sample is combined with the CP correlation previously stored in the (1920 mod 960)=0th location in the CP correlation buffer and stored back in the same location. This process continues for all the samples to be processed. At the end, the CP correlation buffer has the CP correlation combined over the configured number of slots, which is 20 slots in the example of FIG. 7.

In parallel, the newly computed average power is non-coherently combined with the previously stored value for the same sample offset modulo the coherent combining interval. By the non-coherently combining, absolute values of the average power values are obtained and then combined, such that the signs of the two values are not considered. For example, when non-coherently combining complex numbers, the absolute values of the complex numbers are used $\sqrt{Real^2+Imag^2}$. In case of TDD wireless communication systems, the CP correlation and the average power are accumulated in two separate buffers. The buffer to be used for combining is selected based on comparison of the gain applied by the AGC with the configurable gain threshold. At processing stage 810, a determination is made whether the end of the estimation window duration is reached. If the estimation window duration is not reached, the processing returns to the processing stage 806. If the estimation window duration is reached, the processing continues at the processing stage 812. At processing stage 812, the coherently combined CP correlation is normalized by dividing the CP correlation by the non-coherently combined average power. Note that the normalization may be effectively performed using different methods including methods that may not require division. At processing stage 814, the normalized CP correlation is searched for the maximum of the absolute value of the normalized accumulated correlation. At processing stage 816, the normalized correlation is searched for additional peaks that meet both the absolute and relative thresholds checks. Furthermore, the additional peaks are selected such that they are separated by at least one OFDM symbol length. This removes spurious peaks from being used for frequency offset estimation. In both the processing stage 816 and 818 the normalized CP correlation corresponding to the UL portion is skipped. This may ensure that in case of TDD the CP correlations performed over a UL portion are not considered for peak selection. At processing stage 818, the normalized accumulated CP correlation corresponding to the top peak and the additional peaks are coherently combined to form a single final CP correlation metric. At processing stage 820, the phase of the single final CP correlation metric is computed. The phase may be computed using different methods such as the Coordinate Rotation Digital Computer (CORDIC). At processing stage 822, the frequency offset is computed from the phase computed in processing stage 820. The frequency offset estimation processing terminates at stage 824.

By way of example only, the above-described method may be implemented in a receiver, e.g., a user device such as a wireless mobile station (MS) 12 as shown in FIG. 1.

Figure 9:
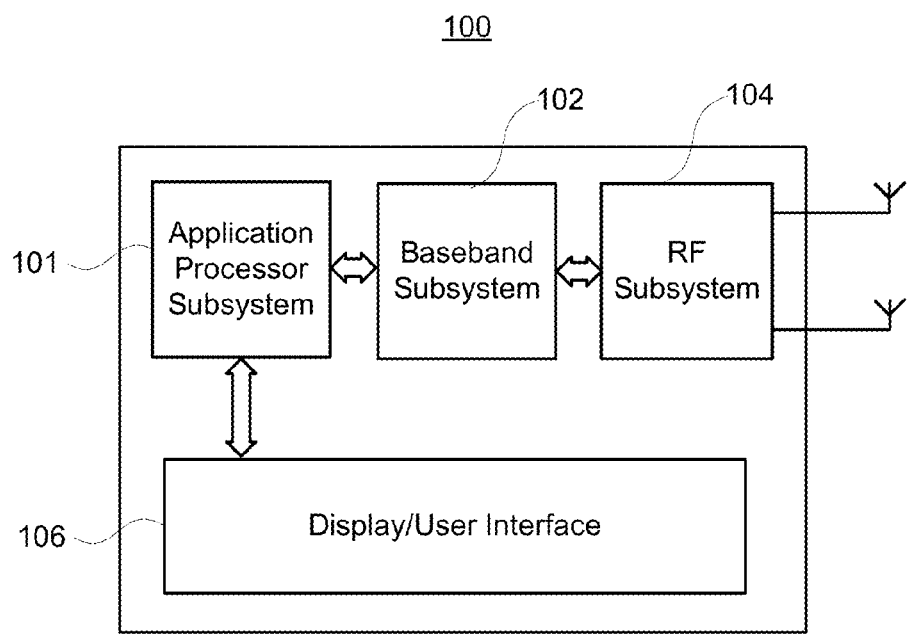
FIG. 9 illustrates a wireless mobile station diagram, which may be employed with aspects of the invention described herein.

As shown in FIG. 9, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 10:
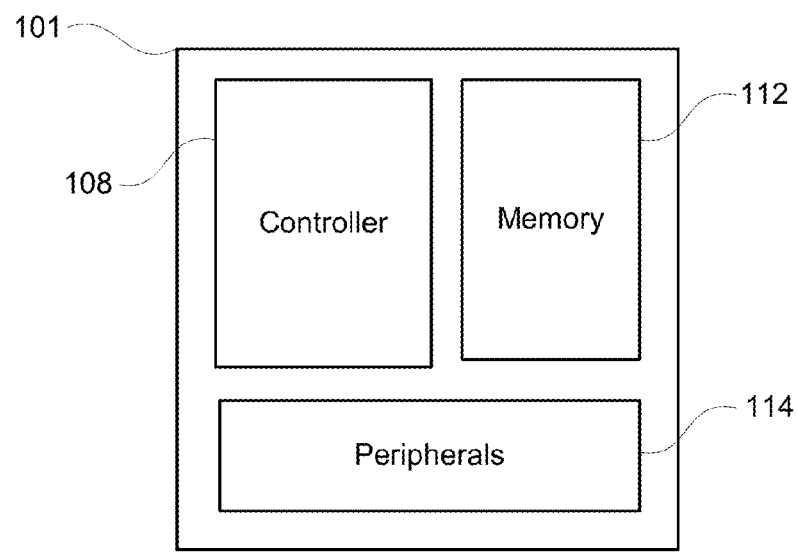
FIG. 10 illustrates an application processor subsystem for a wireless mobile station, which may be employed with aspects of the invention described herein.
Figure 11:
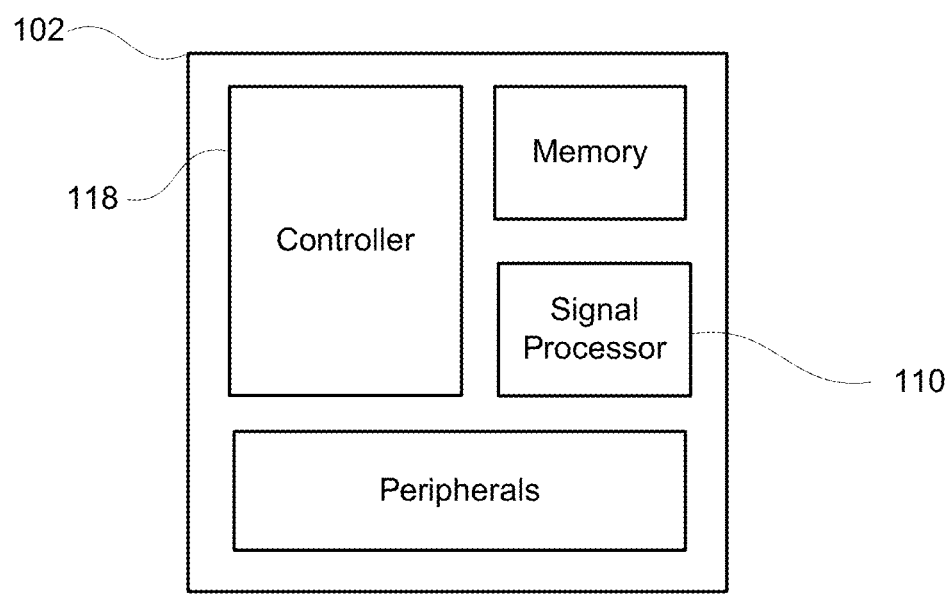
FIG. 11 illustrates a baseband subsystem for a wireless mobile station, which may be employed with aspects of the invention described herein.
Figure 12:
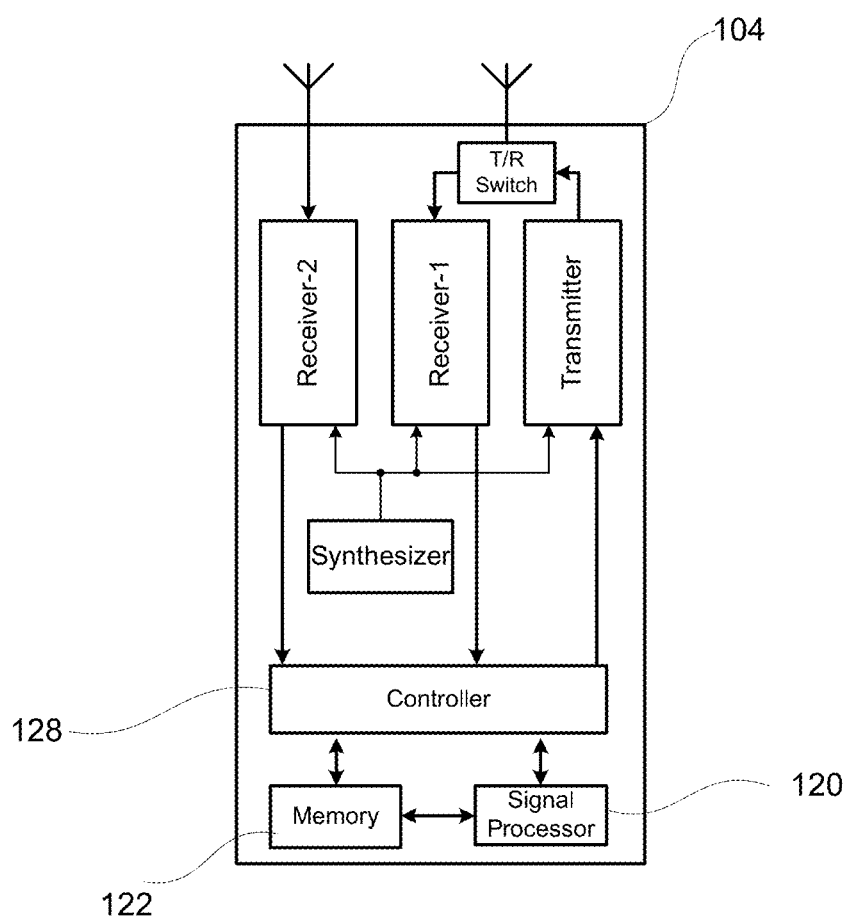
FIG. 12 illustrates an RF subsystem for a wireless mobile station, which may be employed with aspects of the invention described herein.

The application processor subsystem 101 as shown in FIG. 10 may include a controller 108 such as a microcontroller, another processor or other circuitry. The baseband subsystem 102 as shown in FIG. 11 may include a controller 118 such as a microcontroller or other processor. The RF subsystem 104 as shown in FIG. 12 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 11 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

In accordance with such aspects of the present invention, the frequency offset estimation method may be applied to various wireless communication systems such as systems based on an IEEE 802.16 wireless communication standard, an IEEE 802.11 wireless communication standard, an IEEE 802.20 wireless communication standard, or a Long Term Evolution (LTE) or an LTE-Advanced, a 3GPP wireless communication standard.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for frequency offset detection in a wireless communication system using a plurality of Orthogonal Frequency Division Multiplexing (OFDM) signals received at a wireless communication device, in which each OFDM signal includes a cyclic prefix (CP) and a symbol, the symbol of each OFDM signal has a same length and the OFDM signals are of a predetermined periodic interval, the method comprising:

controlling, by a processing device, for each of the OFDM signals received at the wireless communication device, determining a CP correlation value indicating an amount of phase rotation accumulated between the CP and a tail portion of the symbol over a duration of the symbol using a predetermined shortest CP length of the wireless communication system; and controlling, by the processing device:
determining an average power of the OFDM signals;
coherently combining the CP correlation values for the OFDM signals with stored second CP correlation values respectively for a plurality of second OFDM signals, which are offset from the OFDM signals modulo the predetermined periodic interval, to obtain combined CP correlation values;
non-coherently combining the average power of the OFDM signals with a stored second average power of the second plurality of OFDM signals to obtain a combined average power;
normalizing the combined CP correlation values with the combined average power to obtain normalized CP correlation values; and
determining a fractional frequency offset from a final CP correlation value, in which the final CP correlation value is determined from coherently combining a maximum of an absolute value of the normalized CP correlation values and each additional peak of the normalized CP correlation values determined to satisfy first and second threshold conditions for the normalized CP correlation values.

2. The method of claim 1,
wherein the predetermined periodicity interval is one slot of a subframe of a radio frame of the wireless communication system.

3. The method of claim 1,
wherein the OFDM signals are of each available receive chain of a plurality of receive chains with which the wireless communication device is equipped.

4. The method of claim 3,
wherein the predetermined periodicity interval is one slot of a subframe of a radio frame of the wireless communication system,
the method further comprising:
controlling, by the processing device, for all of the available receive chain, coherently combining the CP correlation values for the OFDM signals.

5. The method of claim 1,
wherein the normalizing includes determining a normalization factor for each of the OFDM signals from an average power of the CP and a tail portion of the symbol.

6. The method of claim 1,
wherein the CP correlation values are coherently combined with the stored second CP correlation values based on gain used by an automatic gain control (AGC) at the wireless communication device.

7. The method of claim 6, wherein the gain includes two groups of gain values.

8. The method of claim 7,
wherein the normalizing includes normalizing the coherently combined CP correlation values with the non-coherently combined average power for the two groups of gain values, respectively, to obtain first and second normalized CP correlation values, and
wherein the fractional frequency offset is determined from a higher of a maximum of an absolute value of the first and second normalized CP correlation values.

9. The method of claim 1,
wherein the first threshold condition specifies a minimum magnitude relative to a magnitude of a highest of the normalized CP correlation values, and
wherein the second threshold specifies a minimum value of an absolute value of the normalized CP correlation values.

10. The method of claim 9,
wherein, when at least two additional peaks of the normalized CP correlation values are determined to satisfy the first and second threshold conditions, the final CP correlation value is determined based on coherently combining the maximum of an absolute value of the normalized CP correlation values with the at least two additional peaks when, for all pairs of first and second additional peaks of the at least two additional peaks, the first and second additional peaks are separated by at least the length of the symbol.

11. An apparatus for frequency offset detection in a wireless communication system using a plurality of Orthogonal Frequency Division Multiplexing (OFDM) signals received at a wireless communication device, in which each OFDM signal includes a cyclic prefix (CP) and a symbol, the symbol of each OFDM signal has a same length and the OFDM signals are of a predetermined periodic interval, the apparatus comprising:
circuitry configured to, for each of the OFDM signals received at the wireless communication device, determine a CP correlation value indicating an amount of phase rotation accumulated between the CP and a tail portion of the symbol over a duration of the symbol using a predetermined shortest CP length of the wireless communication system; and
wherein the circuitry is further configured to:
determine an average power of the OFDM signals;
coherently combine the CP correlation values for the OFDM signals with stored second CP correlation values respectively for a plurality of second OFDM signals, which are offset from the OFDM signals modulo the predetermined periodic interval, to obtain combined CP correlation values;
non-coherently combine the average power of the OFDM signals with a stored second average power of the second plurality of OFDM signals to obtain a combined average power;
normalize the combined CP correlation values with the combined average power to obtain normalized CP correlation values; and
determine a fractional frequency offset from a final CP correlation value, in which the final CP correlation value is determined from coherently combining a maximum of an absolute value of the normalized CP correlation values and each additional peak of the normalized CP correlation values determined to satisfy first and second threshold conditions for the normalized CP correlation values.

12. The apparatus of claim 11,
wherein the predetermined periodicity interval is one slot of a subframe of a radio frame of the wireless communication system.

13. The apparatus of claim 11,
wherein the combined CP correlation values are normalized by determining a normalization factor for each of the OFDM signals from an average power of the CP and a tail portion of the symbol.

14. The apparatus of claim 11,
wherein the CP correlation values are coherently combined with the stored second CP correlation values based on gain used by an automatic gain control (AGC) at the wireless communication device.

15. The apparatus of claim 11,
wherein the first threshold condition specifies a minimum magnitude relative to a magnitude of a highest of the normalized CP correlation values, and
wherein the second threshold specifies a minimum value of an absolute value of the normalized CP correlation values.

16. A wireless communication device for detecting frequency offset in a wireless communication system, the device comprising:
a receiver to receive a plurality of Orthogonal Frequency Division Multiplexing (OFDM) signals, in which each OFDM signal includes a cyclic prefix (CP) and a symbol, the symbol of each OFDM signal has a same length and the OFDM signals are of a predetermined periodic interval; and
circuitry configured to, for each of the OFDM signals, determine a CP correlation value indicating an amount of phase rotation accumulated between the CP and a tail portion of the symbol over a duration of the symbol using a predetermined shortest CP length of the wireless communication system,
wherein the circuitry is further configured to:
determine an average power of the OFDM signals;
coherently combine the CP correlation values for the OFDM signals with stored second CP correlation values respectively for a plurality of second OFDM signals, which are offset from the OFDM signals modulo the predetermined periodic interval, to obtain combined CP correlation values;
non-coherently combine the average power of the OFDM signals with a stored second average power of the second plurality of OFDM signals to obtain a combined average power;
normalize the combined CP correlation values with the combined average power to obtain normalized CP correlation values; and
determine a fractional frequency offset from a final CP correlation value, in which the final CP correlation value is determined from coherently combining a maximum of an absolute value of the normalized CP correlation values and each additional peak of the normalized CP correlation values determined to satisfy first and second threshold conditions for the normalized CP correlation values.

17. The device of claim 16,
wherein the predetermined periodicity interval is one slot of a subframe of a radio frame of the wireless communication system.

18. The device of claim 16,
wherein the combined CP correlation values are normalized by determining a normalization factor for each of the OFDM signals from an average power of the CP and a tail portion of the symbol.

19. The device of claim 16,
wherein the CP correlation values are coherently combined with the stored second CP correlation values based on gain used by an automatic gain control (AGC) at the wireless communication device.

20. The device of claim 16,
wherein the first threshold condition specifies a minimum magnitude relative to a magnitude of a highest of the normalized CP correlation values, and
wherein the second threshold specifies a minimum value of an absolute value of the normalized CP correlation values.

* * * * *